United States Patent [19]

Lutz et al.

[11] 4,304,647

[45] Dec. 8, 1981

[54] ARRANGEMENT FOR THE PURIFICATION OF LIQUIDS BY MEANS OF ANODIC OXIDATION

[75] Inventors: Dieter Lutz, Schweinfurt; Franz Nagler, Gochsheim; Michael Grauel, Schwebheim, all of Fed. Rep. of Germany

[73] Assignee: Sachs-Systemtechnik GmbH, Schweinfurt, Fed. Rep. of Germany

[21] Appl. No.: 206,354

[22] Filed: Nov. 13, 1980

[30] Foreign Application Priority Data

Nov. 15, 1979 [DE]  Fed. Rep. of Germany ....... 2946089

[51] Int. Cl.³ .............................................. C25B 11/04
[52] U.S. Cl. ..................................... 204/130; 204/293
[58] Field of Search ................................ 204/293, 130

[56] References Cited
U.S. PATENT DOCUMENTS 2,755,241  7/1956  Bagley et al. ........................ 204/293
4,048,032  9/1977  Eibl ..................................... 204/130

OTHER PUBLICATIONS

"Effect of Mo on Anodic Behavior of Amorphous Fe--Cr--Mo--B Alloys in HCl" by Asami et al., J. Electrochem. Soc., Oct. 1980, pp. 2130–2137.

Primary Examiner—R. L. Andrews
Attorney, Agent, or Firm—Toren, McGeady & Stanger

[57] ABSTRACT

An apparatus and method for the purification of liquids utilizing anodic oxidation wherein the electrodes are composed of an austenitic chromium-nickel-molybdenum steel which contains about 0.07% by weight carbon, more than about 17.0% by weight chromium, about 12.0 to 14.5% by weight nickel and about 2.5 to 4.5% by weight molybdenum. By using the electrodes of the present invention, one can avoid the precipitation of chromium which normally occurs during the purification processes of the prior art.

12 Claims, 1 Drawing Figure

U.S. Patent  Dec. 8, 1981  4,304,647
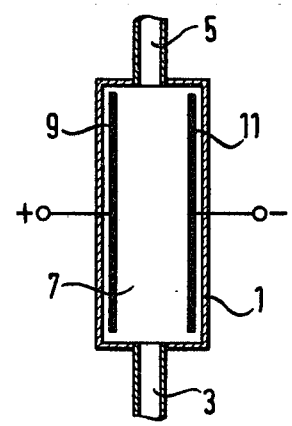

ARRANGEMENT FOR THE PURIFICATION OF LIQUIDS BY MEANS OF ANODIC OXIDATION

BACKGROUND OF THE INVENTION

1. Field of the Invention

The invention relates to an apparatus for the purification of liquids by means of anodic oxidation. More particularly, the invention relates to an apparatus having two electrodes which can be connected to a power source and are immersed in a spaced apart arrangement into the liquid and wherein at least the anode consists of an austenitic chromium-nickel-molybdenum steel.

2. Description of the Prior Art

In German Offenlegungsschrift No. 2 442 078, an arrangement of this type is used to purify water and particularly to remove germs from water. To ensure that the electrodes are resistant against the water to be purified and its impurities, they consist of a stainless austenitic chromium-nickel-molybdenum steel. However, it has been found that, at the currents required for the purification of water, the electrode which is used as the anode precipitates chromium in an amount which may exceed the limits permissible for drinking water.

SUMMARY OF THE INVENTION

We have discovered an apparatus and method which reduces the amount of chromium precipitation normally occurring with the stainless steel electrode of the above-described prior art purification apparatus. Specifically, we have found that this can be accomplished by using an electrode consisting of a steel which contains at most about 0.07% by weight carbon, more than 17.0% by weight chromium, about 12.0 to 14.5% by weight nickel and about 2.5 to 4.5% by weight molybdenum.

BRIEF DESCRIPTION OF THE DRAWING

The drawing is a schematic diagram of an apparatus in accordance with the present invention.

DESCRIPTION OF THE PREFERRED EMBODIMENT

The chromium portion is preferably from about 17.5 to 18.0% by weight, while the molybdenum portion is preferably about 2.7% by weight. Compared to the DIN-steel X 10 CrNiMoTi 1810 (DIN 17 440), known as V 4 A Extra, the chromium precipitation can be reduced by at least 40% (DIN stands for German Industrial Standards).

Surprisingly, it has been found that the chromium precipitation becomes especially low if at least the surface of the steel is soft-annealed. With a test load of 0.05 kp and a test period of from 10 to 15 seconds, the Vickers or pyramid hardness should be less than 130. An especially uniform surface composition is achieved by the soft-annealing.

Furthermore, it has been found advantageous if the surface is as smooth as possible. Specifically, the peak-to-valley height should be less than 0.5 $\mu$m measured with a test apparatus, because it has been found that a roughness which is too great will promote the chromium precipitation. Additionally, the surface of the steel is preferably polished.

For the same reason, steels are preferred which are free from titanium or niobium as the stabilizing component. It has been found that, during the operation of the apparatus of the present invention, titanium and niobium are precipitated to a lesser degree than the remaining components of the steel. The titanium and niobium crystals remaining at the surface increase the roughness of the surface during operation.

The enclosed FIGURE schematically shows a flow-through cell for the purification and germicidal treatment of water. The flow-through cell comprises a housing 1 with a supply line 3 and an outlet 5 for the water. Two spaced apart electrodes 9 and 11 are arranged in the flow-through space 7 and are connected to the positive and negative poles of a direct current source. The water flowing through the flow-through space 7 is purified by means of anodic oxidation through the current flowing between the two electrodes 9 and 11.

At least the electrode 9 connected to the positive pole of the direct current source (anode) consists of an austenitic steel with carbon which is not stabilized with titanium or niobium, the steel containing less than 0.07% by weight carbon, about 18% by weight chromium, between 12.0 and 14.5% by weight nickel and about 2.7% by weight molybdenum. Preferably, electrode 11 also consists of this steel. At least the surfaces of the electrodes 9 and 11 which face each other are polished and have a mean peak-to-value height of less than 0.5 $\mu$m, measured in accordance with DIN 4768, without taking into consideration singular extreme values. The steel of the electrodes 9 and 11 is soft-annealed and has a pyramid hardness in the order of magnitude of 130, measured with a small-load test apparatus according to DIN 50 133 with a test load of 50 g and a duration of the action of the test force of 10 to 15 seconds.

It shall be emphasized that the invention is not limited to the arrangement illustrated in the FIGURE and particularly, the illustrated shape of the housing and the electrodes. Instead of a direct voltage source, it is also possible to use an alternating voltage source of low frequency.

What is claimed is:

1. In a method for the purification of liquids by means of anodic oxidation wherein an anode and a cathode which are connected to a voltage source are immersed in spaced-apart position into the liquid to be purified, the improvement wherein at least the anode consists of an austenitic chromium-nickel-molybdenum steel and wherein the electrodes consist of a steel which contains about 0.07% by weight carbon, more than about 17.0% by weight chromium, about 12.0 to 14.5% by weight nickel, and about 2.5 to 4.5% by weight molybdenum.

2. The method of claim 1 wherein the steel contains about 17.5 to 18.0% by weight chromium and about 2.7% by weight molybdenum.

3. The method of claim 1 wherein at least the surface of the steel is soft-annealed.

4. The method of claim 3 wherein the pyramid hardness of the steel is less than 130 with a test load of 0.05 kp and a test duration of 10 to 15 seconds.

5. The method of claim 1 wherein the mean peak-to-valley height of the steel is less than 0.5 $\mu$m.

6. The method of claim 1 wherein the carbon is present in the steel structure in the non-stabilized form.

7. An apparatus for the purification of liquids by means of anodic oxidation comprising two electrodes which can be connected to a voltage source for spaced apart immersion into the liquid, wherein at least the anode consists of an austenitic chromium-nickel-molybdenum steel and wherein the electrodes consist of a steel which contains about 0.07% by weight carbon, more than about 17.0% by weight chromium, about 12.0 to 14.5% by weight nickel and about 2.5 to 4.5% by weight molybdenum.

8. The apparatus of claim 7 wherein the steel contains about 17.5 to 18.0% by weight chromium and about 2.7% by weight molybdenum.

9. The apparatus of claim 7 wherein at least the surface of the steel is soft-annealed.

10. The apparatus of claim 9 wherein the pyramid hardness of the steel is less than 130 with a test load of 0.05 kp and a test duration of 10 to 15 seconds.

11. The apparatus of claim 7 wherein the mean peak-to-valley height of the steel is less than 0.5 $\mu$m.

12. The apparatus of claim 7 wherein the carbon is present in the steel structure in the non-stabilized form.

* * * * *